(12) United States Patent
Hu et al.

(10) Patent No.: US 10,482,137 B2
(45) Date of Patent: Nov. 19, 2019

(54) NONLINEAR MODELS FOR MEMBER SEARCHING

(71) Applicant: Microsoft Technology Licensing, LLC, Redmond, WA (US)

(72) Inventors: Bo Hu, Mountain View, CA (US); Shan Zhou, San Jose, CA (US); Qi Guo, Sunnyvale, CA (US); Xianren Wu, San Jose, CA (US); Anish Ramdas Nair, Fremont, CA (US); Patrick Cheung, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 210 days.

(21) Appl. No.: 15/852,857

(22) Filed: Dec. 22, 2017

(65) Prior Publication Data

US 2019/0197188 A1  Jun. 27, 2019

(51) Int. Cl.
*G06F 16/30* (2019.01)
*G06F 16/951* (2019.01)
*G06Q 50/00* (2012.01)
*G06N 5/04* (2006.01)

(52) U.S. Cl.
CPC ............ *G06F 16/951* (2019.01); *G06N 5/04* (2013.01); *G06Q 50/01* (2013.01)

(58) Field of Classification Search
CPC ............................... G06F 16/951; G06Q 50/01
See application file for complete search history.

(56) References Cited

U.S. PATENT DOCUMENTS

| 8,812,690 | B1* | 8/2014 | Ramesh | G06Q 10/10 |
| | | | | 709/227 |
| 9,105,069 | B2* | 8/2015 | Posse | G06Q 30/0234 |
| 2014/0195549 | A1* | 7/2014 | Ahn | H04L 51/32 |
| | | | | 707/749 |
| 2014/0337419 | A9* | 11/2014 | Zhang | H04L 67/306 |
| | | | | 709/204 |
| 2015/0088793 | A1* | 3/2015 | Burgess | G06N 20/00 |
| | | | | 706/12 |
| 2015/0106365 | A1* | 4/2015 | Shah | G06Q 50/01 |
| | | | | 707/725 |
| 2015/0189028 | A1* | 7/2015 | Sayed | H04W 4/21 |
| | | | | 709/204 |
| 2015/0347917 | A1* | 12/2015 | Hua | G06N 5/048 |
| | | | | 706/52 |
| 2016/0124956 | A1* | 5/2016 | Conover | G06F 16/9024 |
| | | | | 707/748 |

(Continued)

*Primary Examiner* — Mahesh H Dwivedi
(74) *Attorney, Agent, or Firm* — Schwegman, Lundberg & Woessner, P.A.

(57) ABSTRACT

A system and method includes receiving a search query and obtaining, from a database, member data of a member. For each of a plurality of nonlinear models, the nonlinear model is traversed based on a comparison of characteristics to conditions to obtain a score, wherein, among the nonlinear models, at least one characteristic is an inferred characteristic based on at least one of: activities by the member in an online networking system; and connections by the member in the online networking system. The score obtained from each of the nonlinear models is combined to obtain a combined score and a user interface to displays information related to the member based, at least in part on the combined score.

20 Claims, 7 Drawing Sheets

(56) References Cited

U.S. PATENT DOCUMENTS

2016/0350666 A1* 12/2016 Andrews ................. H04L 67/22
2016/0350669 A1* 12/2016 Jurka ................ G06F 16/24578
2016/0352530 A1* 12/2016 Andrews .............. H04L 67/306
2017/0214589 A1*  7/2017 Conover ............. G06F 16/9024
2017/0372336 A1* 12/2017 Han ................... G06Q 30/0202

* cited by examiner

NONLINEAR MODELS FOR MEMBER SEARCHING

TECHNICAL FIELD

The subject matter disclosed herein generally relates to nonlinear models for member searching.

BACKGROUND

Recruiters for a variety of purposes, including job recruiters, may utilize online social networking systems to identify candidates for a position. Conventionally, recruiters may scan through profiles and compile a list of prospects. The recruiters may then contact some or all of the prospects with information about the position using one of several communications media. Prospects who reply to the communication may then enter a normal recruitment process, such as with live meetings and interviews.

BRIEF DESCRIPTION OF THE DRAWINGS

Some embodiments are illustrated by way of example and not limitation in the figures of the accompanying drawings.

DETAILED DESCRIPTION

Figure 1:
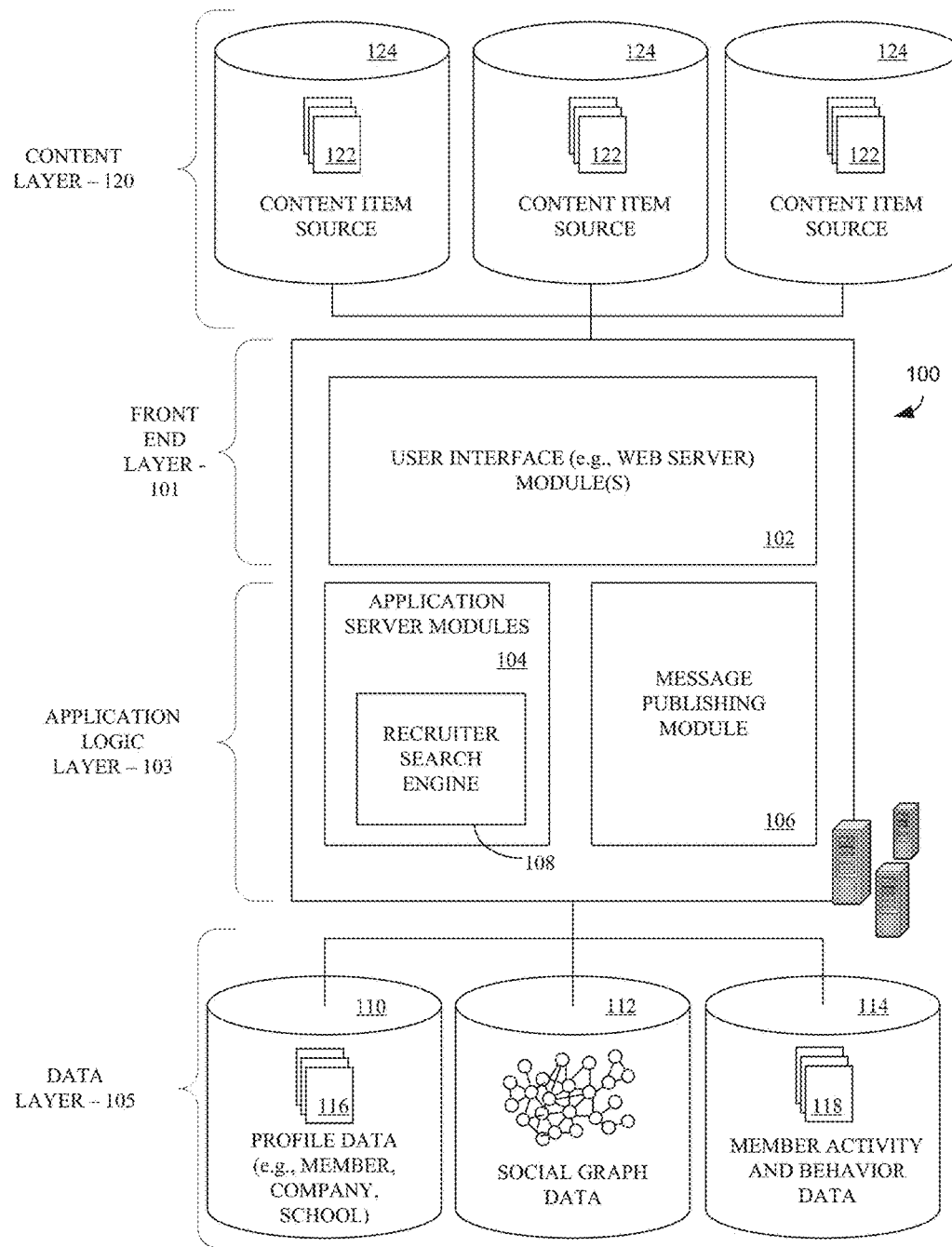
FIG. 1 is a block diagram illustrating various components or functional modules of an online social networking system, consistent with some examples.

Example methods and systems are directed to nonlinear models for member searching. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A recruiter may specify particular characteristics of members of an online social networking system that the recruiter desires for a particular position. Conventionally, a recruiter may specify desired characteristics that may be found in a member profile, such as education, current and past job titles, years of experience, location, and so forth, (referred to herein as "content characteristics") as well as desired characteristics related to activities by the member on the online social networking system, such as an amount or rate of activity on the online social networking system, whether the member is seeking a new position, whether the member has applied for a new position, and so forth (referred to herein as "contextual characteristics"). In such conventional systems, a search engine may cross-reference the input characteristics against data stored in databases and output a list of one or more members of the online social networking system who are potential candidates for the position based on the number and type of matching characteristics.

However, such conventional candidate search systems may be significantly limited in their scope, i.e., to the characteristics in the search terms as received, and the manner in which and the data against which those characteristics are cross-referenced. Such a conventional search system may simply search through individual characteristics stored in the online social networking system's databases and output results without respect to the relationships between those characteristics and how one characteristic may make another characteristic more or less relevant to the position in question. As a result, such searches may be comparatively unfocused, inefficiently utilizing computing resources to cross-reference relatively less relevant characteristics while also outputting results of the search that might not be the best candidates for the position.

A recruiter search system has been developed that utilizes multiple nonlinear models, such as search trees, to provide recruiter searches based on characteristics with empirically-determined relationships to one another. The search trees provide the capacity to infer and consider additional types of characteristics beyond the conventional content characteristics and contextual characteristics. Such inferred characteristics may include desirability of the candidate based on the rate at which the member is approached and interacted with by other recruiters, relevant social network connections, and so forth. The search trees each include characteristics of one or more types, e.g., content characteristics, contextual characteristics, and inferred characteristics, and, as the search trees are traversed, only those characteristics that are actually considered in the tree may be accessed from the databases of the online social networking system. As a result, the relevance of the search results may be significantly improved while potentially reducing the utilizing of computing resources in comparison to certain conventional searches.

FIG. 1 is a block diagram illustrating various components or functional modules of an online social networking system 100, consistent with some examples. A front end 101 consists of a user interface module (e.g., a web server) 102, which receives requests from various client-computing devices, and communicates appropriate responses to the requesting client devices. For example, the user interface module(s) 102 may receive requests in the form of Hypertext Transport Protocol (HTTP) requests, or other web-based, application programming interface (API) requests. An application logic layer 103 includes various application server modules 104, which, in conjunction with the user interface module(s) 102, may generate various user interfaces (e.g., web pages, applications, etc.) with data retrieved from various data sources in a data layer 105. In some examples, individual application server modules 104 may be used to implement the functionality associated with various services and features of the social network service. For instance, the ability of an organization to establish a presence in the social graph of the social network system 100, including the ability to establish a customized web page on behalf of an organization, and to publish messages or status updates on behalf of an organization, may be services implemented in independent application server modules 104. Similarly, a variety of other applications or services that are made available to members of the social network service may be embodied in their own application server modules 104. Alternatively, various applications may be embodied in a single application server module 104. In some examples, the social network system 100 includes a content item publishing module 106, such as may be utilized to receive content, such as electronic messages, posts, links, images, videos, and the like, and publish the content to the social network.

One or more of the application server modules 104, the content item publishing module 106, or the social network system 100 generally may include a recruiter search engine 108. As will be disclosed in detail herein, the recruiter search engine 108 may utilize multiple search trees with predetermined characteristics empirically determined to relate to one another.

The recruiter search engine 108 may be implemented on a separate server or may be part of a server that provides other portions of the social network system 100. Thus, it is to be understood that while the recruiter search engine 108 is described as an integral component of the online social networking system 100, the principles described herein may be applied without the recruiter search engine 108 being an integral part of the online social networking system or even necessarily utilizing data from a social network if information that would normally be stored in the data layer 105 is available from alternative sources.

As illustrated, the data layer 105 includes, but is not necessarily limited to, several databases 110, 112, 114, such as a database 110 for storing profile data 116, including both member profile data as well as profile data for various organizations. Consistent with some examples, when a person initially registers to become a member of the social network service, the person may be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 110. Similarly, when a representative of an organization initially registers the organization with the social network service, the representative may be prompted to provide certain information about the organization. This information may be stored, for example, in the database 110, or another database (not shown). With some examples, the profile data may be processed (e.g., in the background or offline) to generate various derived profile data. For example, if a member has provided information about various job titles the member has held with the same or different companies, and for how long, this information can be used to infer or derive a member profile attribute indicating the member's overall seniority level, or seniority level within a particular company. With some examples, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some examples, a member may elect to "follow" another member. In contrast to establishing a connection, the concept of "following" another member typically is a uni-lateral operation, and at least with some examples, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph database 112.

Activities by users of the social network system 100, including past interactions that have resulted from prior searches conducted by the recruiter search engine 108, may be logged as activities 118 in the activity and behavior database 114. Such activities may include search terms, interactions with search results by recruiters, and subsequent engagement between the recruiter and the candidate members who were produced by searches, and so forth. Profile data 116, activities 118, and the social graph of a member may collectively be considered characteristics of the member and may be utilized separately or collectively as disclosed herein.

The data layer 105 collectively may be considered a content item database, in that content items, including but not limited to member profiles 116, may be stored therein. Additionally or alternatively, a content item layer 120 may exist in addition to the data layer 105 or may include the data layer 105. The content item layer 120 may include individual content items 122 stored on individual content item sources 124. The member profiles 116 and the activities 118 may be understood to be content items 122, while the profile database 110, the social graph database 112, and the member activity database 114 may also be understood to be content item sources 124. Content items 122 may further include sponsored content items as well as posts to a news feed, articles or links to websites, images, sounds, event notifications and reminders, recommendations to users of the social network for jobs or entities to follow within the social network, and so forth.

The social network system 100 may provide a broad range of other applications and services that allow members the opportunity to share and receive information, often customized to the interests of the member. For example, with some examples, the social network service may include a photo sharing application that allows members to upload and share photos with other members. With some examples, members may be able to self-organize into groups, or interest groups, organized around a subject matter or topic of interest. With some examples, the social network service may host various job listings providing details of job openings with various organizations.

Although not shown, with some examples, the social network system 100 provides an application programming interface (API) module via which third-party applications can access various services and data provided by the social network service. For example, using an API, a third-party application may provide a user interface and logic that enables an authorized representative of an organization to publish messages from a third-party application to various content streams maintained by the social network service.

Such third-party applications may be browser-based applications, or may be operating system-specific. In particular, some third-party applications may reside and execute on one or more mobile devices (e.g., phone, or tablet computing devices) having a mobile operating system.

Figure 2:
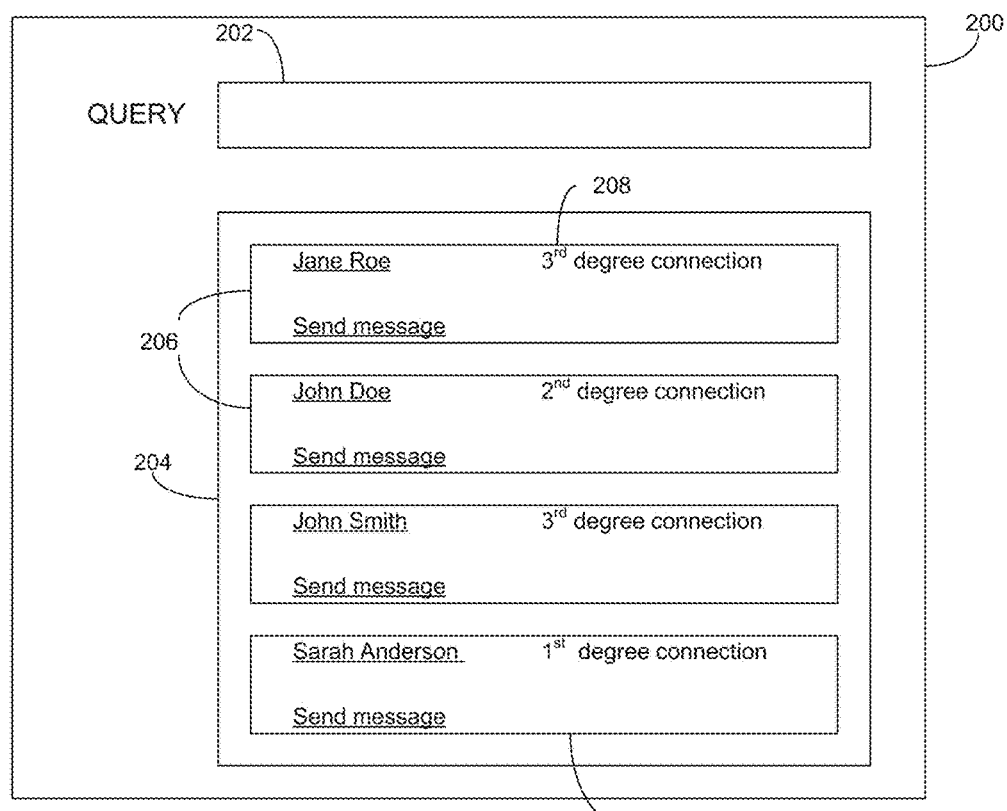
FIG. 2 is a simplified depiction of a user interface as provided by a social networking system, in an example embodiment.

FIG. 2 is a simplified depiction of a user interface 200 as provided by the social networking system 100, in an example embodiment. The user interface 200 may be displayed on a user device, such as a personal computer, tablet computer, smartphone, and the like. The user interface 200 includes a search query line 202 and a search results window 204. The search query line 202 may receive a text string or any other suitable input from a recruiter or other user of the online social networking system 100. The user interface module 102 may receive the search query and transmit the search query to the application logic layer 103 and the recruiter search engine 108. The recruiter search engine 108 may operate as disclosed herein to obtain a search result that may include one or more member profiles 116 that the recruiter search engine 108 determines are suitable matches to the search query. The member profile results 206, which may include member profile information from the data layer 105, one or more links (e.g., to a member profile page, to initiate communication with the member, and so forth), and additional potential information, may be sorted from top 208 to bottom 210 according to their respective scores, as disclosed herein, or according to any other suitable ordering criterion.

Figure 3:
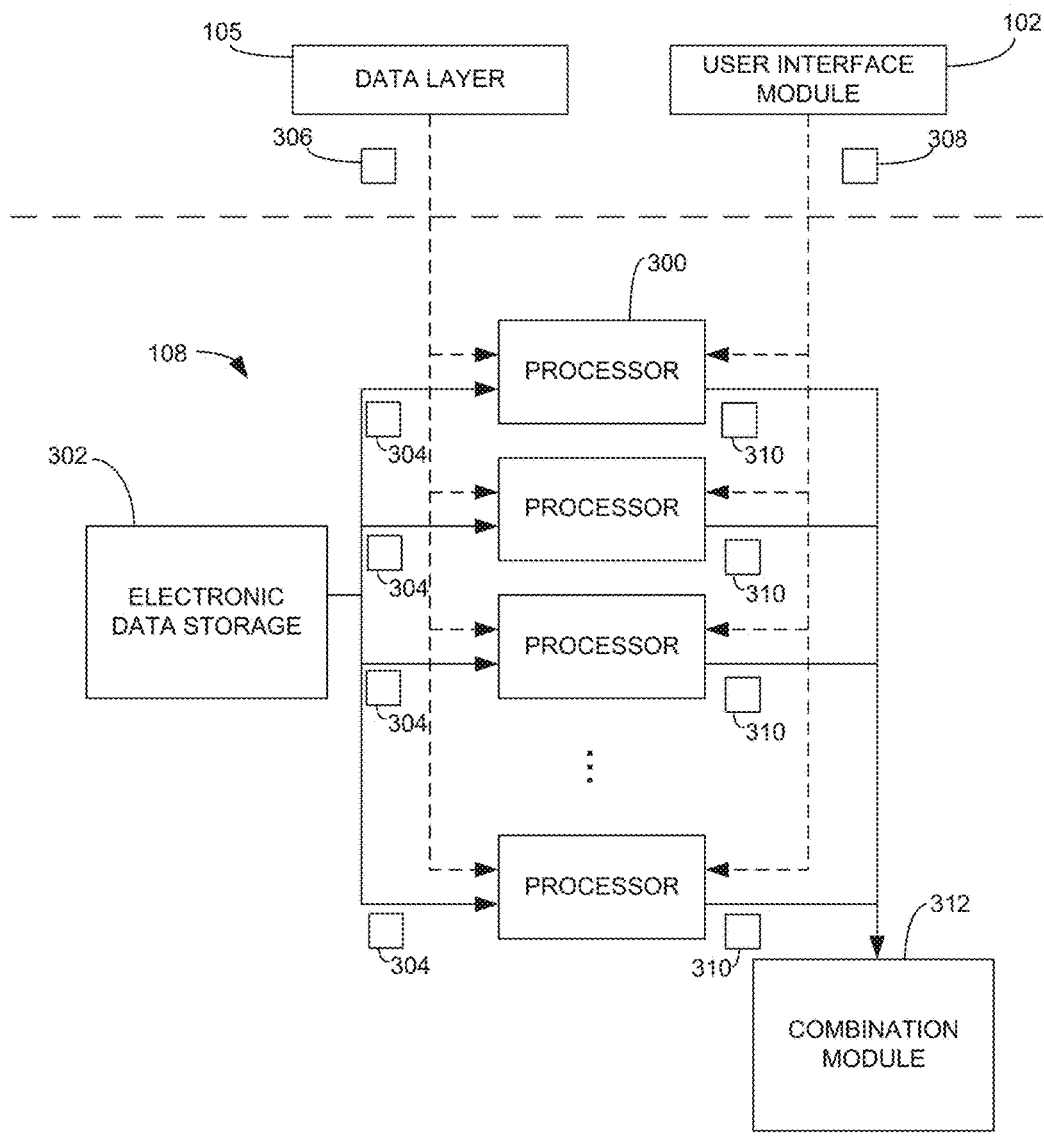
FIG. 3 is a block diagram of a recruiter search engine, in an example embodiment.

FIG. 3 is a block diagram of the recruiter search engine 108, in an example embodiment. The recruiter search engine 108 includes one or more processors 300 and an electronic data storage 302. The electronic data storage 302 includes multiple nonlinear models 304, such as search trees, each including a plurality of features which compare an aspect of the search query obtained from the search query line 202 (FIG. 2) with the member profile data 116, member activity data 118, and any other data available in the data layer 105, hereinafter member data 306. Member data 306 for each member of the online social networking system 100 may be provided to the recruiter search engine or only member data 306 for only a subset of members of the online social networking system 100 may be provided. In various examples, each member data 306 is serially provided to the recruiter search engine 108 and for assessment against the nonlinear models, i.e., each member or subset of members of the online social networking system 100 is individually considered in series by the recruiter search engine, though it is to be recognized and understood that with enhanced processing resources multiple sets of member data 306, i.e., multiple members, may be considered simultaneously.

The processors 300 may be programmed to execute one or more nonlinear models 304 in response to receipt of a search query 308 from the user interface module 102 and member data 306 along with one or more member data 306. In an example, the processors 300 operate in parallel, with each processor 300 implementing one or more of the nonlinear models 304, in various examples without duplication between individual processors 300, e.g., each nonlinear model 304 is implemented by one and only one processor 300 for given member data 306. In an example, the number of processors 300 equals the number of nonlinear models 306 and all nonlinear models 306 are implemented simultaneously and in parallel by the processors 300.

Each processor 300 is configured to output a score 310 obtained by implementing the respective nonlinear model or models 306. If a processor 300 runs more than one nonlinear model 306 then the processor 300 outputs multiple scores 310, one for each model 306 the processor 300 ran. Each score 310 is transmitted to combination module 312 to obtain a combined score. In an example, each individual score 310 is summed together to obtain the combined score. In alternative examples, the individual scores are combined by any other suitable mathematical operation or operations.

In an example, the electronic data storage 302 includes forty (40) nonlinear models 304. Each processor 300 receives a nonlinear model 304, some or all of the member data 306 for a member, and the search query 308. In various examples where there are forty (40) or more processors 300, each processor 300 receives a unique one of the forty (40) nonlinear model 304 and processes that nonlinear model 304 in view of the received member data 306 and search query 308. If there are insufficient processors 300 for each to run only one nonlinear model 304, upon completing processing the first nonlinear model 304 received, the electronic data storage 302 transmits a second nonlinear model 304 to the processor 300 and continues to do so until each of the forty (40) nonlinear models 304 have been processed by one processor 300 and forty (40) scores 310 have been received by the combination module 312 and utilized to produce one combined score for the member/member data 306. The process then repeats for all of the member data 306 has been processed against the nonlinear models 304 or another condition, such as a timeout, has been met.

The use of the nonlinear models 304 thus provides both flexibility to implement the analysis disclosed herein with respect to any of a variety of systems, including but not limited to the system 100, and any of a variety of changing circumstances within those systems. Furthermore, the use of nonlinear models 304 provides an inherent basis for allowing the computations to occur in parallel with the various processors 300. In contrast to various alternative mechanisms for determining search results in a system, having multiple nonlinear models 304 which are executed independently of and without respect to one another allows for the automatic provision to run the nonlinear models 304 in parallel without the inefficiencies that may be introduced by other mechanisms for performing computations in parallel.

The process described above for one member/member data 306 may be applied for some or all of the members of the online social networking system 100, with each member considered receiving a combined score for the same search term 308. The recruiter search engine 108 may then order the members according to their respective combined scores and output a list of members according to their respective combined scores. The members output may be a predetermined number of members who have the highest combined scores, all members who have a combined score that meet a condition, such as a minimum combined score threshold, or any other standard as set for the online social networking system 100 or as selected by the recruiter. Moreover, while the disclosure herein focuses on the use of nonlinear models 304, it is noted and emphasized that this disclosure may be combined with other conventional searching requirements to refine the eventual output of members. Thus, for instance, the recruiter may specify other conditions, e.g., minimum experience, which are required, in which case the recruiter search engine 108 may not output a member who does not have the required characteristic even if that member has a combined score that meets a threshold condition, in an example embodiment.

Figure 4:
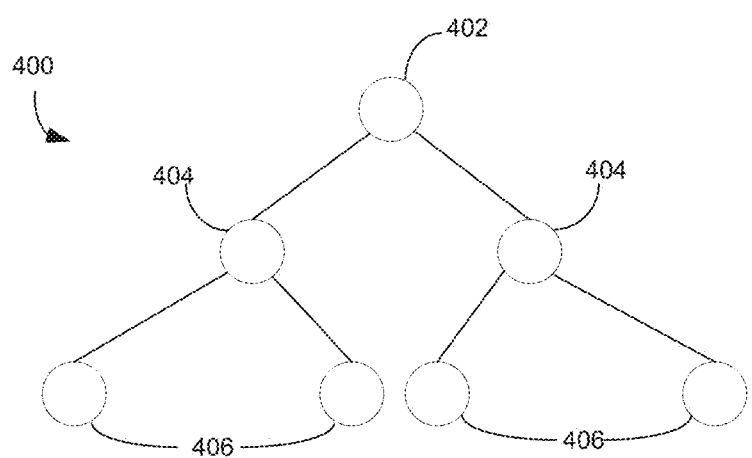
FIG. 4 is a graphical illustration of a nonlinear model implemented as a search tree, in an example embodiment.

FIG. 4 is a graphical illustration of a nonlinear model 304 implemented as a search tree 400, in an example embodiment. The search tree 400 comprises characteristics nodes, including a first level node 402 and two second level nodes 404. As such, the search tree 400 is a binary search tree. However, it is to be recognized and understood that non-binary search trees may be utilized as well for the nonlinear model 304. Moreover, while the search tree 400 is illustrated with two levels, it is to be recognized and understood that the search tree 400 may include more levels. Further, the search tree 400 is merely illustrative of one of the nonlinear models 304, and it is emphasized that each of the nonlinear models 304 stored in the electronic data storage 302 may incorporate two or more levels and be binary or non-binary, as appropriate to the circumstances of that particular nonlinear model 304.

Each characteristic node 402, 404 includes a characteristic and a condition against which data about the member being assess is compared. The search tree further includes result nodes 406 that are arrived at based on the relationship between the condition and the associated member data. Each result node 406 includes a score 310 that is provided to the combination module 312. In various examples, only one score 310 from one result node 406 is obtained and transmitted for each search tree 400.

An example search tree 400 is provided for illustrative purposes. The first level node 402 has a characteristic of "number of accepted electronic messages" and a condition of: less than or equal to five, proceed to A; greater than five, proceed to B. The second level node 402A has a characteristic of "is a dormant user" and a condition of: "yes", proceed to A; "no", proceed to B. The second level node 402B has a characteristic of "current job title match score" and a condition of: less than or equal to 0.1428, proceed to A; greater than 0.1428, proceed to B. The result node 406A has a score 310 of −0.39, the result node 406B has a score 310 of 0.057, the result node 406C has a score 310 of 0.041, and the result node 406D has a score 310 of 0.18.

Figure 5A:
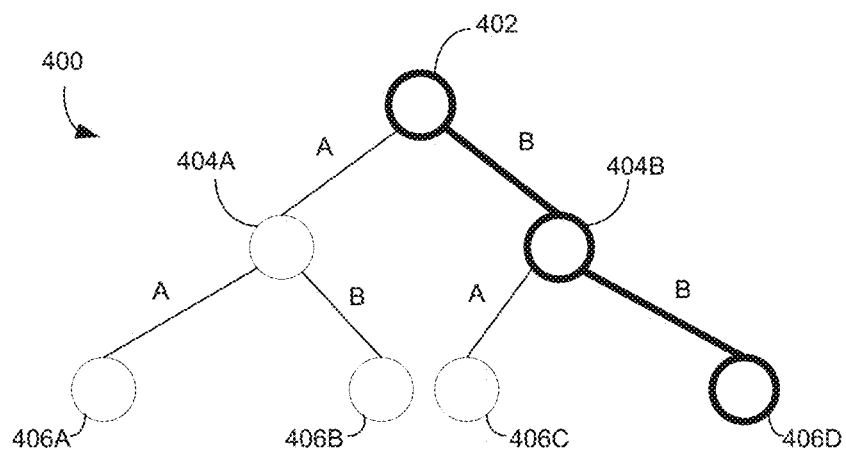
FIGS. 5A and 5B illustrate different traversals of an example search tree for two different members of an online social networking system.
Figure 5B:
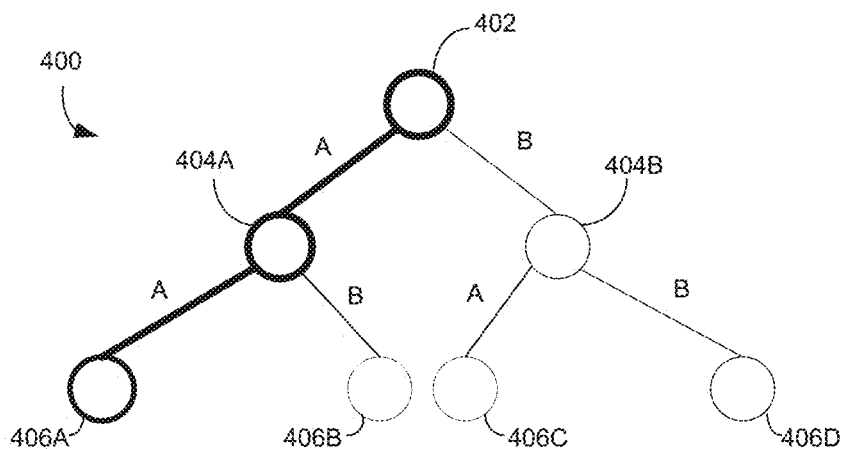

FIGS. 5A and 5B illustrate different traversals of the example search tree 400 for two different members of the online social networking system 100.

In the example of FIG. 5A, a processor 300 implements the example search tree 400 from the electronic data storage 302 based on a search query 308. In an example, the processor 300 determines the characteristics included in the search tree 400, e.g., by accessing metadata that includes the characteristics or by traversing all of the nodes 402, 404 of the search tree 400 and transmits a request to the data layer 105 to obtain member data 306 for the member that includes the data related to the characteristics as determined. Alternatively, the processor 300 may not pre-request the member data 306 and instead separately request member data 306 corresponding to characteristics of nodes 402, 404 that are actually reached during the traversal of the search tree 400. In the illustrative example, the member has a number of accepted electronic messages of ten (10), a dormant user status of "false", and a current job title of "computer engineer".

The processor 300 starts at the first level node 402 and compares the number of accepted electronic messages from the member data 306, i.e., ten (10), to the condition in the first level node 402, i.e., less than or equal to five, proceed to A; greater than five, proceed to B. Based on the comparison, the processor 300 proceeds along path B to the second level node 404B.

The processor 300 may compute, determine, or receive a job title score based on a relationship between a job title received in the search term 308 and the job title of the member from the member data 306. In various examples, common job titles may have tables that provide points of comparison, e.g., "software engineer" in a search term 308 in relation to a job title of the member being "computer engineer" may correspond to a job title match score of 0.5 in a lookup table accessed by the processor 300. Additionally or alternatively, the processor 300 may compare keywords between the job titles, e.g., to identify that fifty percent of the words match, or may analyze the results of past searches to understand that, e.g., approximately fifty percent of the time that a searcher searches on "software engineer" they would find a "computer engineer" to be of interest. The examples for obtaining the job title score are purely illustrative and any mechanism for obtaining a numerical representation of the relationship between the job title of the search term 308 and of the member may be utilized.

The processor 300 then compares the title match score from the member data 306, i.e., 0.5, to the condition of the second level node 404B, i.e., less than or equal to 0.1428, proceed to A; greater than 0.1428, proceed to B. Based on the comparison, the processor 300 then proceeds to the result node 406D. The processor 300 then outputs the score 310 of the result node 406D, i.e., 0.18, to the combination module 312.

In the example of FIG. 5B, a processor 300 implements the example search tree 400 from the electronic data storage 302 based on the search query 308 utilized in the example of FIG. 5A. In an example, the processor 300 determines the characteristics included in the search tree 400, e.g., by accessing metadata that includes the characteristics or by traversing all of the nodes 402, 404 of the search tree 400 and transmits a request to the data layer 105 to obtain member data 306 for the member that includes the data related to the characteristics as determined. Alternatively, the processor 300 may not pre-request the member data 306 and instead separately request member data 306 corresponding to characteristics of nodes 402, 404 that are actually reached during the traversal of the search tree 400. In the illustrative example, the member has a number of accepted electronic messages of five (5), a dormant user status of "true", and a current job title of "electrical engineer".

The processor 300 starts at the first level node 402 and compares the number of accepted electronic messages from the member data 306, i.e., five (5), to the condition in the first level node 402, i.e., less than or equal to five, proceed to A; greater than five, proceed to B. Based on the comparison, the processor 300 proceeds along path a to the second level node 404A.

The processor 300 then compares the dormant status from the member data 306, i.e., "true", to the condition of the second level node 404B, i.e., "yes", proceed to A; "no", proceed to B. Based on the comparison, the processor 300 then proceeds to the result node 406A. The processor 300 then outputs the score 310 of the result node 406A, i.e., −0.39, to the combination module 312.

As noted, the examples of FIGS. 5A and 5B show how the same search tree 400 may be traversed based on the same search query 308 for different members of the online social networking system 100. For any particular search query 308 and member, it is noted and emphasized that each nonlinear model 304 is implemented by at least one processor 300 and a score 310 obtained by the combination module 312 for each nonlinear model 304 for that member.

As noted herein, the particular characteristics and conditions of each nonlinear model 304 may be determined empirically based on the circumstances in which the nonlinear models 304 are implemented. Thus, the details of the underlying online social networking system or any other system in which the nonlinear models 304 are applied and the data available in that system may dictate what characteristics are applicable and how those characteristics relate with respect to one another, and what conditions are relevant to those characteristics. In various examples, machine learning algorithms may analyze the available data of the underlying system to identify such relationships and establish the characteristics and conditions for the nonlinear models 304.

In various examples, the characteristics, also known as "features", utilized may include: a number of terms of the search query 308 that match terms in the member data 306; a fraction of terms of the search query 308 that match terms in the member data 306; a frequency with which terms of the search query 308 match terms in the member data 306; a number of "tagged" or specially noted/marked characteristics in the member data 306, such as the member's first name, last name, current employer, current job title, etc.; a fraction of tagged characteristics in the member data 306; a frequency of tagged characteristics in the member data 306; a sum of skill reputation scores for the member; a sum of specified skill reputation scores for the member; if the search query 308 has the first name of the member; if the search query 3078 has the last name of the member; if the search query 308 has the current employer of the member; if the search query 308 has the current job title of the member; if the search query 308 has the current industry of the member; if the member is interested in a new job; a composite job seeker score of the member; if the search query 308 has a current region of the member; if the search query 308 has a current country of the member.

The characteristics may further include: a network distance of the member to a search query 308 term; a connection strength of the member with regard to other members of the online social networking system 100; an influencer status of the member with respect to other members; a number of days since the member registered with the online social networking system 100; a number of days since the member modified their profile; a longest number of days the member was in a job; a longest number of days the member was with an employer; total work experience in days; a quantitative assessment of the quality of the member's profile; a popularity score of the member; if the search query 308 has a skill of the member; if the search query 308 has a school associated with the member; if the search query 308 is found in a headline; of number of common connections between the member the searcher; a geographic match between the member and a member and the searcher; a distance between the member and the searcher.

The characteristics may further include: if the member has a minimum number of terms matching the search query 308 within a predetermined distance within the member profile; if the member has a maximum number of terms matching the search query 308 within the predetermined distance; if the search query 308 is a full match for various aspects of the member data 306; a Jaccard similarity of the search query 308 to the member data 306, including any specific member data noted herein; if the member is an influencer and matches any one or more of a current employer and a current title with the search query 308; a full match of terms of the search query 308 in headline information of the member data 306; a full match of keywords of the search query in headline information of the member data 306; if the search query 308 has a full match for the member's name; if the member has no current position; if the member has no education listed; a number of current positions; a number of past positions; a number of educational institutions and/or degrees; a number of matching skill terms in the search query 308 and the member data 306; a number of terms of the search query 308 matching in a summary of the member data 306; a score indicative of activity in electronic communications within the online social networking system 100; and a BM25 Best Matching ranking function known in the art.

Further characteristics include: if a current employer of the searcher matches a current employer of the member; if a past employer of the searcher matches a past employer of the member; if a school of the searcher matches a school of the member; a score relating to a match between a current employer of the searcher and member; a score relating to a match between a past employer of the searcher and member; a score relating to a match between a school of the searcher and the member; a score relating to a match between an industry of the searcher and the member; a score indicative of a quality of the member data 306 with respect to the online social networking system 100; a score indicative of an engagement level of the member with the online social networking system 100; a score indicative of an engagement level of the searcher with the online social networking system 100; a number of electronic messages the searcher has received in the online social networking system; a number of electronic messages the searcher has responded to; an affinity score indicative of an affinity between the searcher and the member; a social graph distance between the searcher and the member; a number of common connections between the searcher and the member; a number of common groups between the searcher and the member; if the member has a member life cycle of at least four logins to the online social networking system per week each of the preceding four weeks; if the member has a member life cycle of at least one login per week each of the preceding three weeks; and if the member has a member life cycle of at least one login in the last week; if the member has a member life cycle that is dormant.

For various of the characteristics in relation to the member data 306, the characteristic may be applied to the member data 306 generally or to one or more specified portions of the member data. Those portions may include: a body of the member data 306; a first and last name of the member; a first name of the member; a last name of the member; a current job title of the member; a past job title of the member; a current school of the member; and a past school of the member; a current position; a past position; a current employer; a past employer.

Thus, the characteristics include content characteristics, such as education, current and past job titles, years of experience, location, and so forth. The characteristics further include contextual characteristics, such as desired characteristics related to activities by the member on the online social networking system, such as an amount or rate of activity on the online social networking system, whether the member is seeking a new position, whether the member has applied for a new position, and so forth. Finally, the characteristics include inferred characteristics, such as the desirability of the member based on the rate at which the member is approached and interacted with by other recruiters, relevant social network connections, and so forth.

Figure 6:
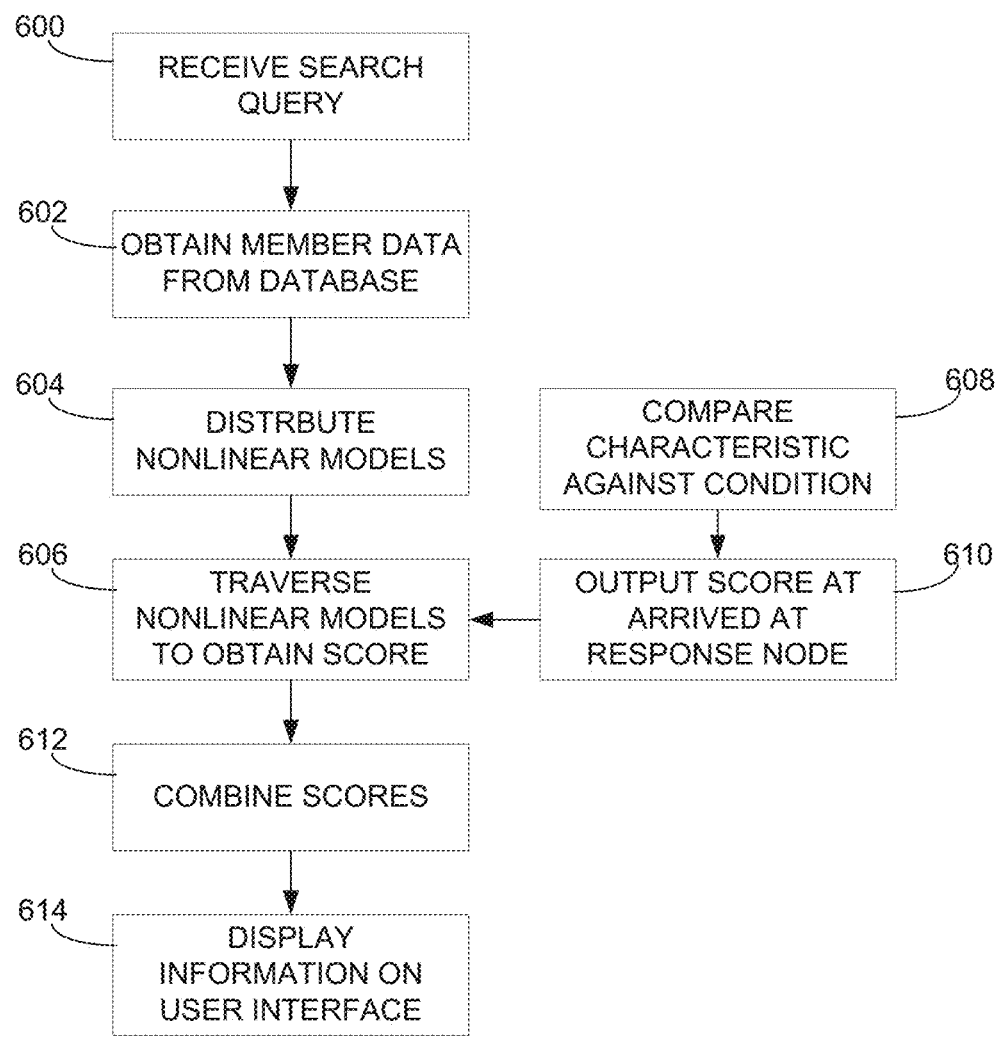
FIG. 6 is a flowchart for applying nonlinear models in member searching, in an example embodiment.

FIG. 6 is a flowchart for applying nonlinear models in member searching, in an example embodiment. While the flowchart is described with respect to the online social networking system 100, it is to be recognized and understood that the principles described may be applied to any suitable system.

At 600, a processor receives a search query, e.g, from a user interface.

At 602, the processor obtains, from a database of an online social networking system, member data of a member of the online social networking system.

At 604, the nonlinear models are distributed to a plurality of processors, each nonlinear model distributed to one processor, each processor receiving at least one nonlinear model.

At 606, for each of a plurality of nonlinear models, the processor traverses the nonlinear model based on a comparison of individual characteristics to associated conditions to obtain a score. In an example, among the nonlinear models, at least one characteristic is an inferred characteristic based on at least one of activities by the member in the online social networking system and connections by the member in the online social networking system. In an example, the characteristics further comprise content characteristics and context characteristics. In an example, the nonlinear models are binary search trees. In an example, traversing the nonlinear models is performed in parallel by the plurality of processors. In an example, each of the nonlinear models includes a plurality of hierarchically related nodes, the nodes including characteristic nodes and result nodes, each characteristic node including a characteristic and a condition to traverse to another node, each result node including a score. In an example, the processor traverses each of the nonlinear models by implementing operations 608 and 610.

At 608, comparing, for each characteristic node arrived at, the characteristic of the node against the member data and traversing to another one of the nodes based on the comparison relative to the associated condition.

At 610, in response to arriving at a result node, outputting the score. In an example, the result nodes are hierarchically lowest nodes of the binary search trees.

At 612, the scores obtained from each of the nonlinear models are combined to obtain a combined score.

At 614, the user interface displays information related to the member based, at least in part on the combined score.

At 616, a combined score is obtained for each of a plurality of members of the online social networking system, and wherein causing the user interface to display the information comprises displaying the members ranked according to their respective scores.

Figure 7:
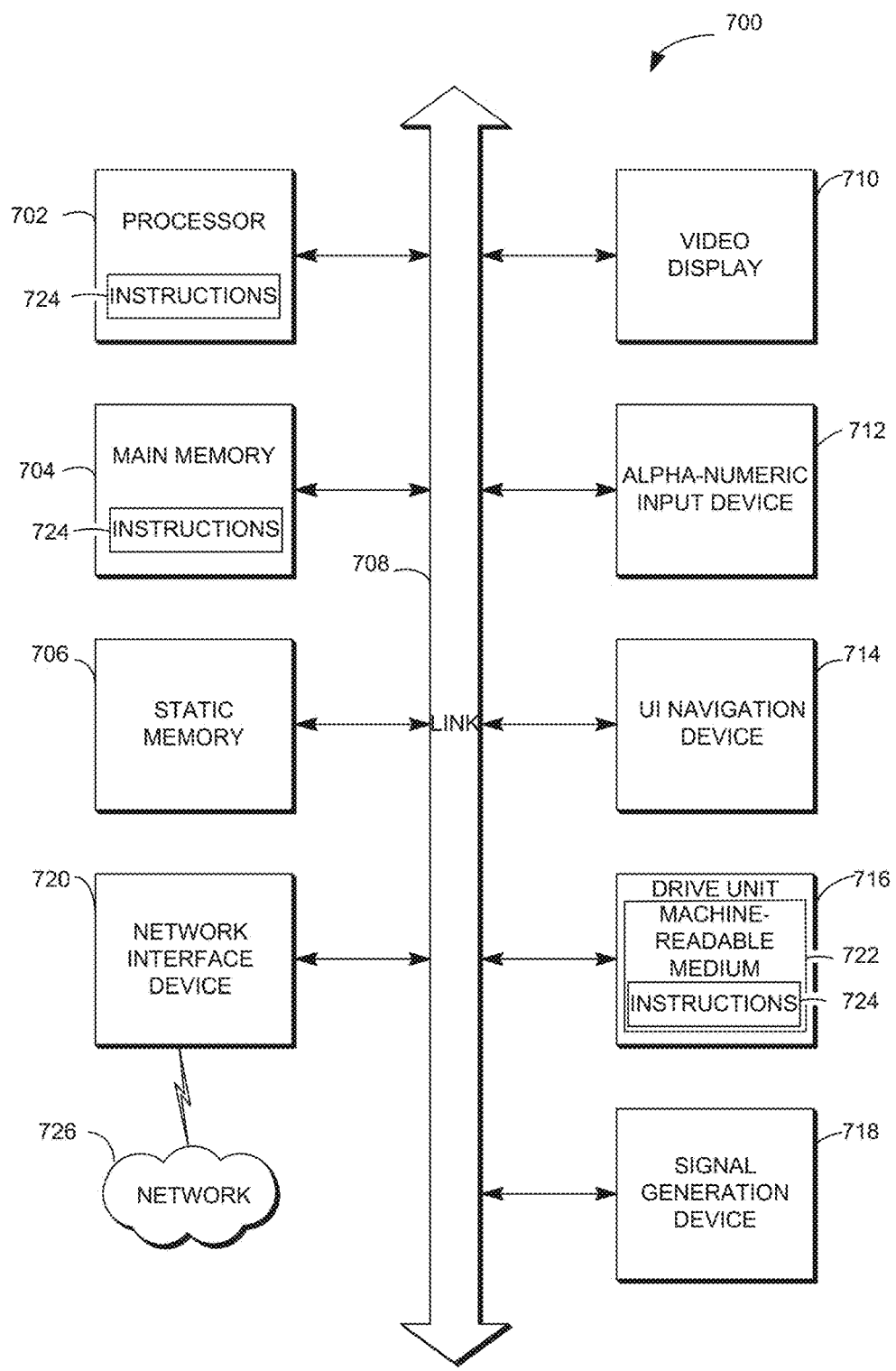
FIG. 7 is a block diagram illustrating components of a machine able to read instructions from a machine-readable medium.

FIG. 7 is a block diagram illustrating components of a machine 700, according to some example examples, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system and within which instructions 724 (e.g., software) for causing the machine 700 to perform any one or more of the methodologies discussed herein may be executed. In alternative examples, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a graphics display 710 (e.g., a plasma display panel (PDP), a light emitting diode (LED) display, a liquid crystal display (LCD), a projector, or a cathode ray tube (CRT)). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media. The instructions 724 may be transmitted or received over a network 726 via the network interface device 720.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing or carrying instructions (e.g., software) for execution by a machine (e.g., machine 700), such that the instructions, when executed by one or more processors of the machine (e.g., processor 702), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium including a signal or a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A processor-implemented method, comprising:
receiving a search query;
obtaining, from a database of an online social networking system, member data of a member of the online social networking system;
for each of a plurality of nonlinear models, traversing the nonlinear model based on a comparison of individual characteristics to an associated condition to obtain a score, wherein, among the nonlinear models, at least one characteristic is an inferred characteristic based on at least one of: activities by the member in the online social networking system; and connections by the member in the online social networking system;
combining the scores obtained from each of the nonlinear models to obtain a combined score; and
causing a user interface to display information related to the member based, at least in part on the combined score.

2. The method of claim 1, wherein each of the nonlinear models includes a plurality of hierarchically related nodes, the nodes including characteristic nodes and result nodes, each characteristic node including a characteristic and a condition to traverse to another node, each result node including a score, wherein traversing the nonlinear model is by:
comparing, for each characteristic node arrived at, the characteristic of the node against the member data and traversing to another one of the nodes based on the comparison relative to the associated condition,
in response to arriving at a result node, outputting the score.

3. The method of claim 2, wherein the nonlinear models are binary search trees.

4. The method of claim 3, wherein the result nodes are hierarchically lowest nodes of the binary search trees.

5. The method of claim 1, wherein the characteristics further comprise content characteristics and context characteristics.

6. The method of claim 1, further comprising:
distributing the nonlinear models to a plurality of processors, each nonlinear model distributed to one processor, each processor receiving at least one nonlinear model; and
wherein traversing the nonlinear models is performed in parallel by the plurality of processors.

7. The method of claim 1, further comprising obtaining a combined score for each of a plurality of members of the online social networking system, and wherein causing the user interface to display the information comprises displaying the members ranked according to their respective scores.

8. A non-transitory computer readable medium comprising instructions which, when performed by a processor, cause the processor to perform operations comprising:
receive a search query;
obtain, from a database of an online social networking system, member data of a member of the online social networking system;
for each of a plurality of nonlinear models, traverse the nonlinear model based on a comparison of individual characteristics to an associated condition to obtain a score, wherein, among the nonlinear models, at least one characteristic is an inferred characteristic based on at least one of: activities by the member in the online social networking system; and connections by the member in the online social networking system;
combine the scores obtained from each of the nonlinear models to obtain a combined score; and
cause a user interface to display information related to the member based, at least in part on the combined score.

9. The non-transitory computer readable medium of claim 8, wherein each of the nonlinear models includes a plurality of hierarchically related nodes, the nodes including characteristic nodes and result nodes, each characteristic node including a characteristic and a condition to traverse to another node, each result node including a score, wherein traversing the nonlinear model is by:
comparing, for each characteristic node arrived at, the characteristic of the node against the member data and traversing to another one of the nodes based on the comparison relative to the associated condition;
in response to arriving at a result node, outputting the score.

10. The non-transitory computer readable medium of claim 9, wherein the nonlinear models are binary search trees.

11. The non-transitory computer readable medium of claim 10, wherein the result nodes are hierarchically lowest nodes of the binary search trees.

12. The non-transitory computer readable medium of claim 8, wherein the characteristics further comprise content characteristics and context characteristics.

13. The non-transitory computer readable medium of claim 8, wherein the instructions further cause the processor to perform operations comprising:
distribute the nonlinear models to a plurality of processors, each nonlinear model distributed to one processor, each processor receiving at least one nonlinear model; and
wherein traversing the nonlinear models is performed in parallel by the plurality of processors.

14. The non-transitory computer readable medium of claim 8, wherein the instructions further cause the processor to perform operations comprising:
obtaining a combined score for each of a plurality of members of the online social networking system; and
wherein causing the user interface to display the information comprises displaying the members ranked according to their respective scores.

15. A system, comprising:
a computer readable medium comprising instructions which, when performed by a processor, cause the processor to perform operations comprising:
receive a search query;
obtain, from a database of an online social networking system, member data of a member of the online social networking system;
for each of a plurality of nonlinear models, traverse the nonlinear model based on a comparison of individual characteristics to an associated condition to obtain a score, wherein, among the nonlinear models, at least one characteristic is an inferred characteristic based on at least one of: activities by the member in the online social networking system; and connections by the member in the online social networking system;

combine the scores obtained from each of the nonlinear models to obtain a combined score; and cause a user interface to display information related to the member based, at least in part on the combined score.

16. The system of claim 15, wherein each of the nonlinear models includes a plurality of hierarchically related nodes, the nodes including characteristic nodes and result nodes, each characteristic node including a characteristic and a condition to traverse to another node, each result node including a score, wherein traversing the nonlinear model is by:

comparing, for each characteristic node arrived at, the characteristic of the node against the member data and traversing to another one of the nodes based on the comparison relative to the associated condition;

in response to arriving at a result node, outputting the score.

17. The system of claim 16, wherein the nonlinear models are binary search trees.

18. The system of claim 17, wherein the result nodes are hierarchically lowest nodes of the binary search trees.

19. The system of claim 15, wherein the characteristics further comprise content characteristics and context characteristics.

20. The system of claim 15, wherein the instructions further cause the processor to perform operations comprising:

distribute the nonlinear models to a plurality of processors, each nonlinear model distributed to one processor, each processor receiving at least one nonlinear model; and wherein traversing the nonlinear models is performed in parallel by the plurality of processors.

* * * * *

UNITED STATES PATENT AND TRADEMARK OFFICE
CERTIFICATE OF CORRECTION

PATENT NO. : 10,482,137 B2
APPLICATION NO. : 15/852857
DATED : November 19, 2019
INVENTOR(S) : Hu et al.

Page 1 of 1

It is certified that error appears in the above-identified patent and that said Letters Patent is hereby corrected as shown below:

In the Claims

Column 15, Line 42, Claim 2, delete "condition," and insert --condition;-- therefor Signed and Sealed this
Twenty-first Day of April, 2020

Andrei Iancu
*Director of the United States Patent and Trademark Office*